(12) United States Patent
Matsuhira

(10) Patent No.: US 8,982,426 B2
(45) Date of Patent: Mar. 17, 2015

(54) IMAGE PROCESSING APPARATUS, PRINTING APPARATUS AND IMAGE PROCESSING METHOD

(71) Applicant: Seiko Epson Corporation, Tokyo (JP)

(72) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/706,118

(22) Filed: Dec. 5, 2012

(65) Prior Publication Data

US 2013/0148139 A1 Jun. 13, 2013

(30) Foreign Application Priority Data

Dec. 7, 2011 (JP) ................................. 2011-267521

(51) Int. Cl.
*H04N 1/40* (2006.01)
*G06K 15/02* (2006.01)
*H04N 1/41* (2006.01)

(52) U.S. Cl.
CPC . *G06K 15/02* (2013.01); *H04N 1/41* (2013.01)
USPC .......................................... 358/468; 358/539

(58) Field of Classification Search
USPC ....................... 358/1.9, 2.1, 539, 426.02, 468; 382/289, 295–297, 232, 245–248
See application file for complete search history.

(56) References Cited

U.S. PATENT DOCUMENTS 7,974,480 B2 * 7/2011 Ren .............................. 382/232
2007/0242308 A1 * 10/2007 Michaelson ................. 358/1.18

FOREIGN PATENT DOCUMENTS

JP 09-247423 A 9/1997
JP 2006-313984 A 11/2006

* cited by examiner

*Primary Examiner* — Thomas D Lee
*Assistant Examiner* — Stephen M Brinich
(74) *Attorney, Agent, or Firm* — Nutter McClennen & Fish LLP; John J. Penny, Jr.; Megan E. Jeans

(57) ABSTRACT

JPEG data to be printed is Huffman-decoded on a block-by-block basis and is stored in a Huffman decoded data storage unit as Huffman decoded data, image data is generated by performing a later-stage decoding process (group decoding, run-length decoding, inverse quantization, inverse DCT) on the Huffman decoded data, a display process for displaying an image in a display unit based on the generated image data is executed, and the JPEG data is reconstructed by inserting RST markers at intervals equivalent to every stripe width while encoding the Huffman decoded data produced during the display process and stored in a reconstructed JPEG data storage unit. Then, when rotated printing is instructed, rotation/decoding that performs rotation while decoding the stored reconstructed JPEG data using the RST markers is carried out, print data is created from the image data obtained by the rotation/decoding, and a printing process is executed.

13 Claims, 6 Drawing Sheets

IMAGE PROCESSING APPARATUS, PRINTING APPARATUS AND IMAGE PROCESSING METHOD

CROSS REFERENCES TO RELATED APPLICATIONS

The entire disclosure of Japanese Patent Application No. 2011-267521, filed Dec. 7, 2011 is expressly incorporated by reference herein.

BACKGROUND

1. Technical Field

The present invention relates to image processing apparatuses and image processing methods that generate image data by decoding compressed data compressed through a compression process that includes a variable-length coding process, and that process the generated image data.

2. Related Art

As an example of such an image processing apparatus, an apparatus has been proposed that carries out a rotation process while decoding a compressed image compressed by converting each of 8×8 pixel blocks into which an image has been divided into frequency components and encoding the blocks through variable-length coding such as Huffman coding (for example, see JP-A-9-247423). When this apparatus obtains a compressed image into which a restart marker used in the rotation process has not been inserted, the compressed image is first Huffman-decoded, and then as each block is encoded, a restart marker is inserted each time the encoding of a predetermined number of blocks is completed; through this, a compressed image in which a restart marker is inserted every stripe width (that is, every predetermined number of blocks) is generated. The process of rotating this compressed image is carried out by repeating a process in which a predetermined number of blocks is decoded, the data of a pre-set number of restart markers is skipped each time a restart marker appears, and the next block therebelow in the same stripe is decoded; when all of the blocks in a single stripe width have been decoded, the decoded blocks are then rotated. Then, when the decoding and rotation process for a single stripe width is complete, the process moves to a block in the next stripe width, and repeats the same process for each stripe width, rotating the compressed image while decoding. As a result, a compressed image can be decoded and rotated by decoding and rotating the blocks in a single stripe width one by one in order, even for images in which coded blocks produced by variable-length coding have different data lengths.

Incidentally, in the stated image processing apparatus, it is necessary, in order to insert the restart marker, to Huffman-decode the compressed image and then once again Huffman-code the image, as pre-processing for the rotation process; if this pre-processing is included, the rotation process takes a long time. For example, considering a case of rotated printing, in which an image to be printed is displayed in a display device and the image is rotated and printed after standing by for an instruction from a user, a display process that decodes a compressed image, creates a display image, and displays that image in the display device is executed, after which the apparatus stands by; when an instruction for rotated printing is made, a compressed image in which the restart markers have been inserted is created by executing the stated pre-processing on the compressed image. After this, that compressed image is decoded and rotated on a stripe width-by-stripe width basis using the restart markers, print data is created from the rotated image, and the printing process is executed. As a result, it takes a long time from when the user instructs the rotated printing to when the printing is actually carried out.

SUMMARY

It is an advantage of some aspects of the invention to provide an image processing apparatus and an image processing method that reduce the amount of time required for image processing.

The image processing apparatus and image processing method according to the invention employ the following configurations in order to achieve the aforementioned advantage.

An image processing apparatus according to an aspect of the invention is an image processing apparatus that generates image data by decoding compressed data compressed through a compression process that includes a variable-length coding process and processes the generated image data, and includes: a variable-length coding/decoding unit that generates intermediate data by executing a variable-length coding/decoding process on variable-length code of the compressed data in order to display or sample the compressed data; a first image processing unit that generates image data by executing a later-stage decoding process on the intermediate data and displays or samples the generated image data; a recompression unit that generates recompressed data by executing the variable-length coding process in parallel with the first image processing unit while sharing the intermediate data with the first image processing unit and inserting a restart marker every predetermined number of coded units; and a second image processing unit including a rotation/decoding process that repeatedly executes a process for generating partial image data by partially performing the variable-length coding/decoding process on variable-length code of the recompressed data using the restart markers and partially performing the later-stage decoding process, and rotating the generated partial image data.

With the image processing apparatus according to this aspect of the invention, the intermediate data is generated by executing the variable-length coding/decoding process on the variable-length code of the compressed data and is stored in a storage means; a first image process that generates image data by performing the later-stage decoding process on the stored intermediate data and processes the generated image data is executed; the variable-length coding process is performed on the intermediate data and the restart markers are inserted every predetermined number of coded units while sharing the stored intermediate data, and the resulting data is stored in the storage means as the recompressed data; image data is generated by performing the variable-length coding/decoding process on the variable-length code of the stored recompressed data using the restart markers and performing the later-stage decoding process; and the second image process that processes the generated image data is executed. Through this, the recompressed data, into which the restart markers have been inserted, can be created using the intermediate data produced during the execution of the first image process; accordingly, it is not necessary to create the recompressed data again when starting the execution of the second image process, making it possible to reduce the time required to execute the second image process. Here, the "first image process" includes a display process that displays an image based on the generated image data in a display device, and the "second image process" includes a rotation process that repeatedly executes a process for generating a partial image by partially decoding the compressed data using the restart markers and rotating the generated partial image.

In the image processing apparatus according to this aspect of the invention, it is preferable that the first image processing unit and the recompression unit be units that execute processes through parallel processing. This makes it possible to reduce the amount of time required for the image processing.

In addition, with the image processing apparatus according to another aspect of the invention, it is preferable that the compression process be a process including a DCT process and a quantization process in a stage prior to the variable-length coding process, and the later-stage decoding process be a process including an inverse quantization process and an inverse DCT process in a stage after the variable-length coding/decoding process.

An image processing method according to another aspect of the invention is an image processing method that generates image data by decoding compressed data compressed through a compression process that includes a variable-length coding process and processes the generated image data, and includes: (a) generating intermediate data by executing a variable-length coding/decoding process on variable-length code of the compressed data in order to display or sample the compressed data; (b) executing a first image process that generates image data by executing a later-stage decoding process on the intermediate data generated in step (a) and displays or samples the generated image data; (c) executing, in parallel with the first image process, a process for generating recompressed data by executing the variable-length coding process on the intermediate data while sharing the intermediate data generated in step (a) and inserting a restart marker every predetermined number of coded units; and (d) executing a second image process including a rotation/decoding process that partially performing the variable-length coding/decoding process on variable-length code of the recompressed data generated in step (c) using the restart markers and partially performing the later-stage decoding process, and generating the partial image data and repeatedly executing a process of rotating the generated partial image data.

With the image processing method according to this aspect of the invention, the intermediate data is generated by executing the variable-length coding/decoding process on the variable-length code of the compressed data and is stored; a first image process that generates image data by performing the later-stage decoding process on the stored intermediate data and processes the generated image data is executed; the variable-length coding process is performed on the intermediate data and the restart markers are inserted every predetermined number of coded units while sharing the stored intermediate data, and the resulting data is stored as the recompressed data; image data is generated by performing the variable-length coding/decoding process on the variable-length code of the stored recompressed data using the restart markers and performing the later-stage decoding process; and the second image process that processes the generated image data is executed. Through this, the recompressed data, into which the restart markers have been inserted, can be created using the intermediate data produced during the execution of the first image process; accordingly, it is not necessary to create the recompressed data again when starting the execution of the second image process, making it possible to reduce the time required to execute the second image process.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
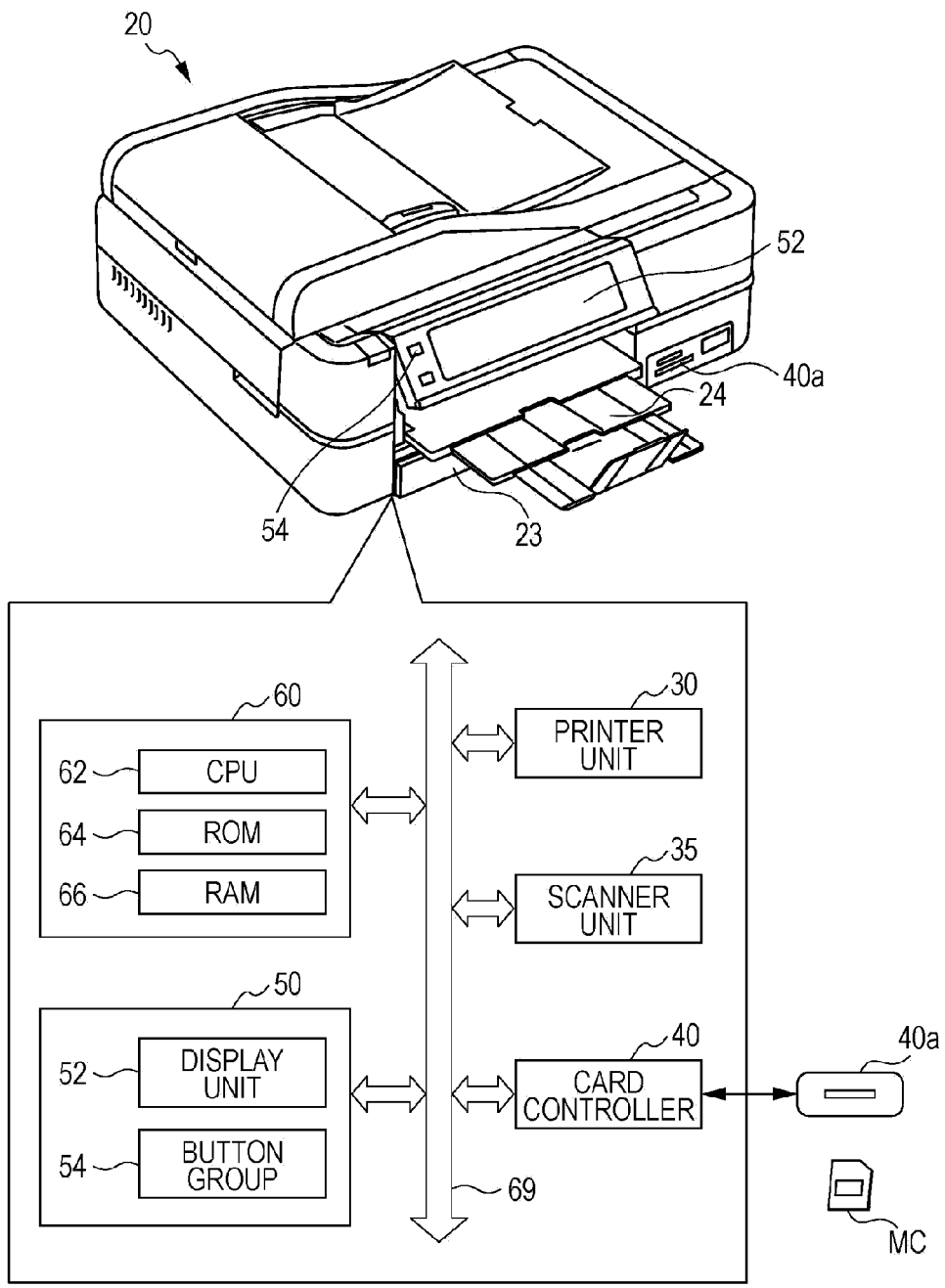
FIG. 1 is a block diagram illustrating the overall configuration of a printer.

Hereinafter, an embodiment of the invention will be described based on the drawings. FIG. 1 is a block diagram illustrating the overall configuration of a printer 20 embodying an image processing apparatus according to the invention. As shown in FIG. 1, the printer 20 according to this embodiment includes: an ink jet printer unit 30 that executes printing by ejecting CMYK, or cyan (C), magenta (M), yellow (Y), and black (K), inks from a print head onto paper transported from a paper feed tray 23 based on print data, and discharges the paper to a discharge tray 24; a flatbed scanner unit 35 that obtains image data by irradiating a document placed on a glass platform (not shown) with light and splits the resulting reflected light into RGB, or red (R), green (G), and blue (B), colors; a card controller 40 that reads/writes files that hold data from/to a memory card MC inserted into a memory card slot 40a; an operation panel 50 that displays setting screens for various modes, setting screens for printing, and so on in a display unit 52, inputs instruction for setting various modes, printing, and so on through the operations of a button group 54 made by a user; and a main controller 60 that controls the apparatus as a whole. This printer 20 is configured so that the printer unit 30, scanner unit 35, card controller 40, main controller 60, and so on can exchange various types of control signals, data, and so on with each other via a bus 69.

The card controller 40 reads out files from the memory card MC based on readout instructions from the main controller 60 and sends the files to the main controller 60, writes files to the memory card MC based on write instructions from the main controller 60, and so on.

Files and the like containing JPEG data, captured by a digital camera or the like and compressed in JPEG format, are stored in the memory card MC. Although details will be omitted here, in JPEG compression, the respective 8-bit RGB values of a captured image are converted into YCbCr values expressing luma and chroma components, the image is divided into 8×8-pixel (64-pixel) minimum coded units (MCUs; called "blocks" hereinafter), after which each block undergoes a discrete cosine transform (DCT) process and is converted into 8×8-component (64-component) DCT coefficients expressing the magnitudes of frequency components; the converted DCT coefficients are then quantized, and the quantized DCT coefficients are entropy-encoded through run-length coding, group coding, Huffman coding, or the like, resulting in a compressed image. Note that with respect to the DCT coefficients of the blocks, the component in the upper-left corner of the block is a DC coefficient (DC component) indicating the average value within that block that does not change, whereas the remaining 63 components are AC coefficients (AC components) that change within the blocks. The DC coefficient often is a similar value to the DC coefficient in an adjacent block, and thus information regarding the value of a difference from the DC coefficient of the adjacent block is encoded. Specifically, information as to what group, among predetermined groups, the block belongs to based on the appearance frequency of the difference value, information as to what difference value within the group to which the block belongs that value corresponds to, and so on are encoded through the corresponding Huffman coding, group coding, or the like. On the other hand, the AC coefficient is often a value of 0 due to only small changes within the block and due to the quantization, and thus information indicating a set of the number of continuous 0 values (the run-length number) and the coefficient that is not a 0 value and thus breaks the continuous 0 values is encoded. Specifically, information as to what group, among predetermined groups, the block belongs to based on the appearance frequency of the coefficient that is not a 0 value, information as to what coefficient within the group to which the block belongs that coefficient corresponds to, information of the run-length number, and so on are encoded through the corresponding Huffman coding, group coding, run-length coding, or the like. Here, because Huffman coding is variable-length coding that assigns shorter code for higher appearance frequencies, the coded data lengths for individual blocks differ from block to block if the image to be compressed is a normal image of a person, a landscape, or the like.

The main controller 60 is configured as a microprocessor having a CPU 62 at its core, and includes a ROM 64 that stores various types of processing programs, various types of data, various types of tables, and so on, and a RAM 66 that temporarily stores various types of data and the like. The main controller 60 is inputted with various types of operation signals, various types of detection signals, and so on from the printer unit 30, the scanner unit 35, the card controller 40, and so on, and is inputted with operating signals from the button group 54 of the operation panel 50. In addition, the main controller 60 outputs instructions for reading out files from the memory card MC to the card controller 40, outputs printing instructions to the printer unit 30, outputs document reading instructions to the scanner unit 35 based on a scan instruction from the button group 54, outputs instructions to display image data to the display unit 52, and so on.

Furthermore, when converting JPEG data inputted from the memory card MC into display data for display in the display unit 52, the main controller 60 decodes (decompresses) the JPEG data in the reverse order as the aforementioned compression, or in other words, performs entropy decoding such as Huffman decoding, group decoding, and run-length decoding, inverse quantization, and inverse DCT; the main controller 60 then performs color conversion for converting YCbCr values obtained through the decoding into 8-bit RGB data, performs a process for reducing the 8-bit RGB data to a predetermined bit number that can be displayed by the display unit 52, and so on. In addition, when converting the JPEG data into print data for printing using the printer unit 30, the main controller 60 first decodes the JPEG data in the same manner as the display data and performs color conversion to convert the resulting data into 8-bit RGB data; the RGB data is then further color-converted into 8-bit CMYK data, after which a process for converting the 8-bit CMYK data into 2-bit data (binary data) through dithering, error diffusion, or the like is carried out.

With this printer 20, various types of settings regarding color correction on the image, the orientation of the image, and so on can be made, and for example, rotated printing, in which printing is carried out after performing a rotation process that rotates the orientation of the image, can also be set. Here, in the case where the target image is JPEG data, the rotation process is carried out using restart markers (RST markers) inserted every predetermined number of blocks (also called "a single stripe width") in the JPEG data. Note that an RST marker is 2-byte code defined by the JPEG standard, and is indicated by FFD0 through FFD7. The rotation process that uses RST markers is carried out by repeating a process in which a predetermined number of blocks is decoded, the data of a pre-set number of restart markers is skipped each time a restart marker appears, and the next block therebelow in the same stripe is decoded; when all of the blocks in a single stripe width have been decoded, the decoded blocks are then rotated. Then, when the rotation process for a single stripe width is complete, the process moves to a block in the next stripe width, and repeats the same process for each stripe width, rotating the compressed image while decoding as a result. Here, the JPEG data is compressed using Huffman coding, which is variable-length coding, and the data lengths in each block resulting from the coding are normally not constant. As a result, the locations of the borders of the respective blocks are not constant as well, and thus it is difficult to decode only the blocks contained in a single stripe width. Accordingly, the JPEG data is first Huffman-decoded, and the JPEG data is reconstructed by inserting RST markers at intervals equivalent to every stripe width while Huffman-coding the data obtained by the stated Huffman decoding; this makes it possible to use the RST markers to decode the reconstructed JPEG data in groups of blocks for each stripe width, which in turn makes it possible to rotate and decode the JPEG data on a stripe width-by-stripe width basis.

Figure 2:
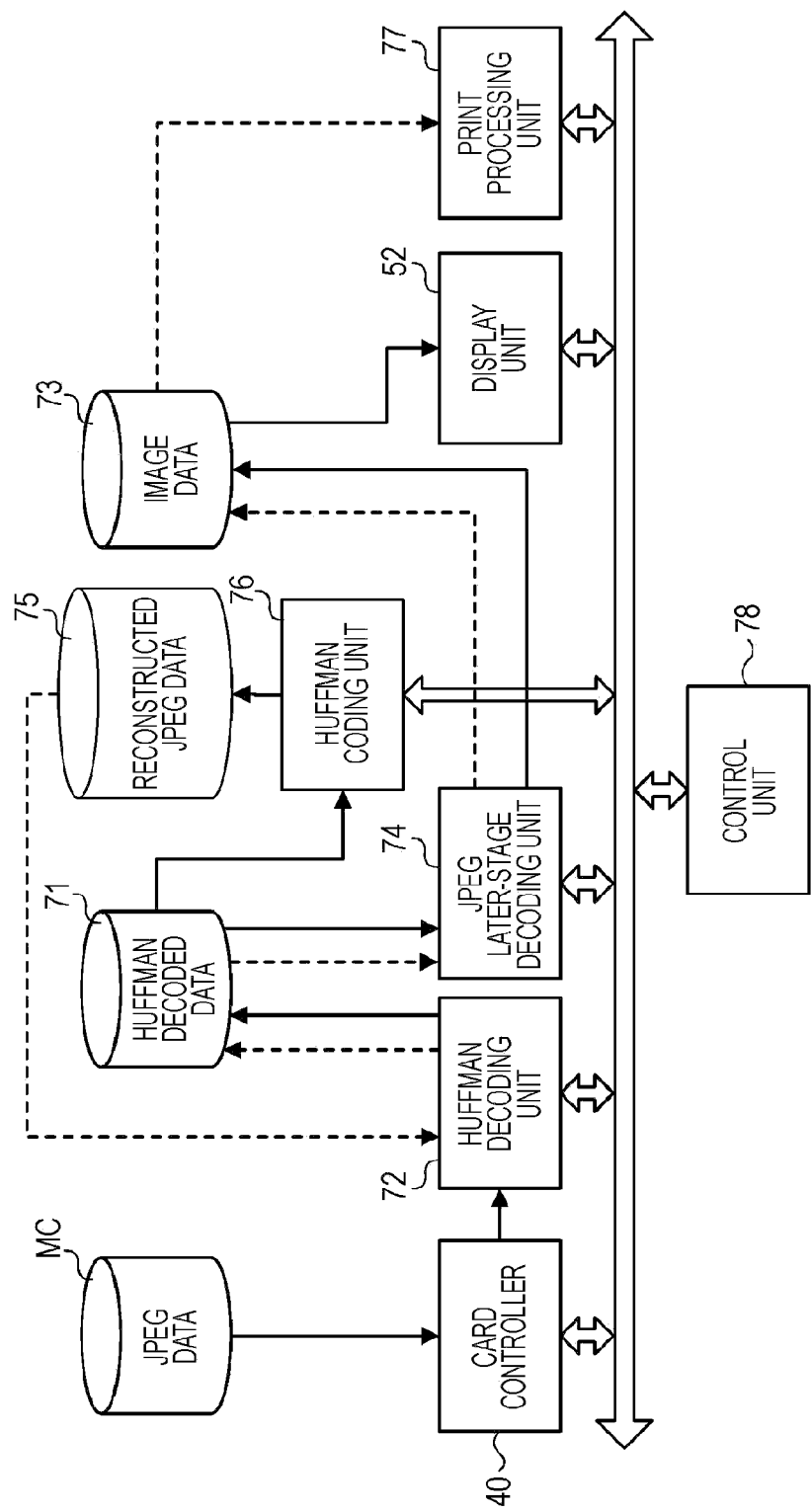
FIG. 2 is a block diagram illustrating functional blocks in a main controller.

FIG. 2 is a block diagram illustrating functional blocks in the main controller 60. Note that FIG. 2 also illustrates the card controller 40, the display unit 52, and so on in addition to the functional blocks of the main controller 60. Note also that the solid arrows in FIG. 2 indicate the flow of data when the JPEG data is converted into display data, whereas the dotted-line arrows in FIG. 2 indicate the flow of data when the JPEG data is converted into the print data through the rotation/decoding. The main controller 60 is configured of: a Huffman decoding unit 72 that reads out JPEG data saved in the memory card MC via the card controller 40, Huffman-decodes the read-out JPEG data, and writes the resulting data into a Huffman decoded data storage unit 71; a JPEG later-stage decoding unit 74 that reads out the Huffman decoded data from the Huffman decoded data storage unit 71, generates image data by executing various types of decoding processes in later stages than the Huffman decoding, such as group decoding, run-length decoding, inverse quantization, inverse DCT, and so on, on the Huffman decoded data, and writes the generated image data into an image data storage unit 73; a Huffman coding unit 76 that reads out the Huffman decoded data from the Huffman decoded data storage unit 71, generates the reconstructed JPEG data by inserting RST markers while Huffman-decoding the read-out Huffman decoded data, and writes the generated reconstructed JPEG data into a reconstructed JPEG data storage unit 75; a print processing unit 77 that reads out the image data stored in the image data storage unit 73 and generates print data based on the read-out image data; and a control unit 78 that manages the processes performed by the various units. Here, in this embodiment, the Huffman decoding unit 72, the JPEG later-stage decoding unit 74, the Huffman coding unit 76, the print processing unit 77, and the control unit 78 function integrally by causing the CPU 62 to execute a program stored in the ROM 64. In addition, the Huffman coding unit 76 is configured of, for example, dedicated hardware, and is capable of processing that is parallel with the processes executed by the Huffman decoding unit 72, the JPEG later-stage decoding unit 74, the print processing unit 77, the control unit 78, and so on. Note that the Huffman decoded data storage unit 71, the image data storage unit 73, the reconstructed JPEG data storage unit 75, and so on are provided in the RAM 66 of the main controller 60.

Figure 3:
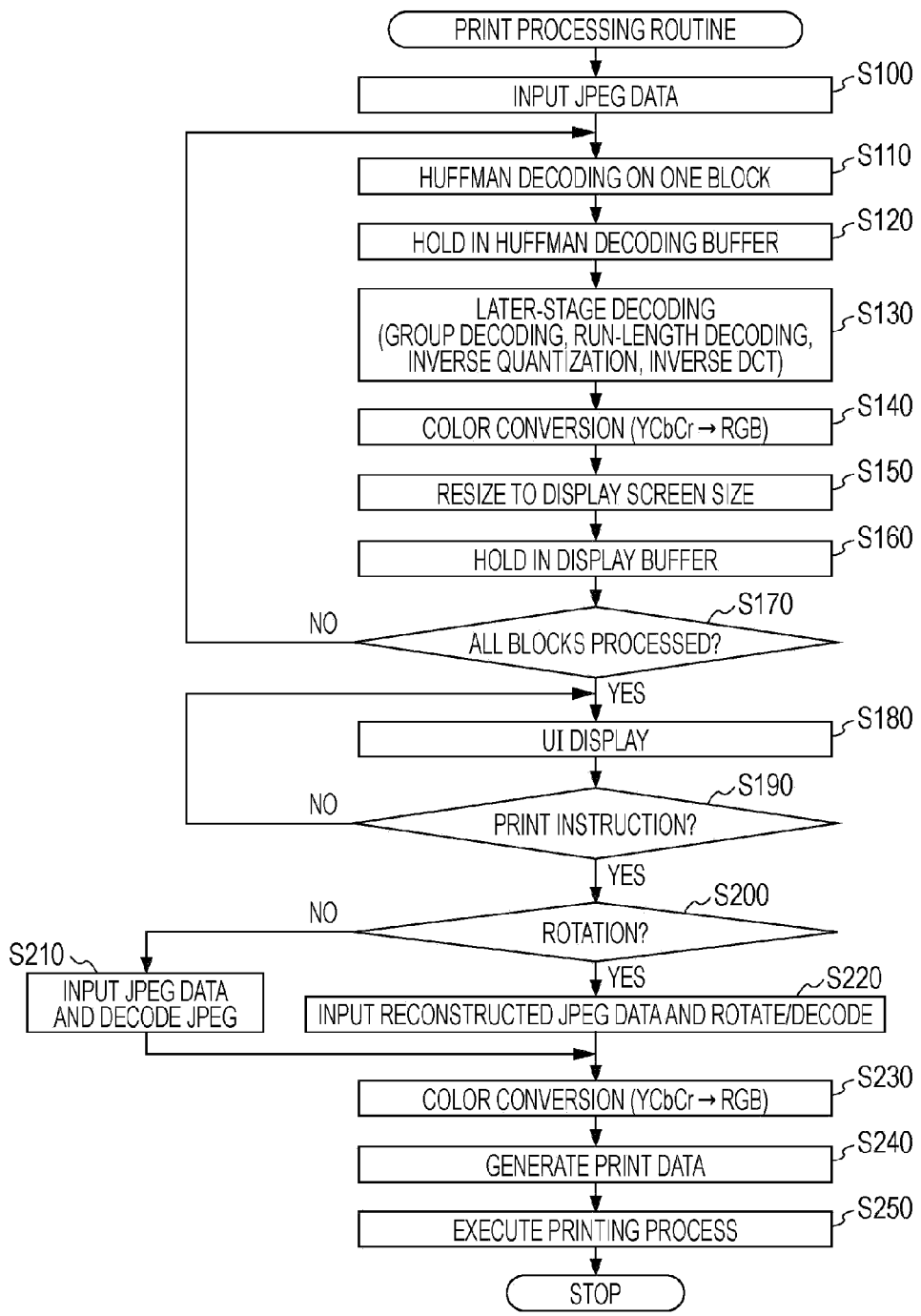
FIG. 3 is a flowchart illustrating an example of a printing process routine.

Next, operations of the printer 20 according to the embodiment configured in this manner, and particularly operations carried out when executing rotated printing, will be described. FIG. 3 is a flowchart illustrating an example of a printing process routine executed by the CPU 62. This routine is executed when an image to be printed is selected, through operations made using the button group 54, from a selection screen displayed in the display unit 52 when the memory card MC is inserted into the memory card slot 40a.

When this printing process routine is executed, first, the CPU 62 of the main controller 60 inputs compressed data (here, JPEG data) to be printed (step S100), Huffman-decodes one block's worth of the inputted JPEG data (step S110), and stores the Huffman-decoded one block's worth of Huffman decoded data in the Huffman decoded data storage unit 71 (step S120). When the Huffman decoded data is stored in the Huffman decoded data storage unit 71, the JPEG reconstruction process, which reconstructs the Huffman decoded data into JPEG data that includes RST markers, is executed by the Huffman coding unit 76. Here, descriptions of the printing process routine will be suspended in order to describe the JPEG reconstruction process.

Figure 4:
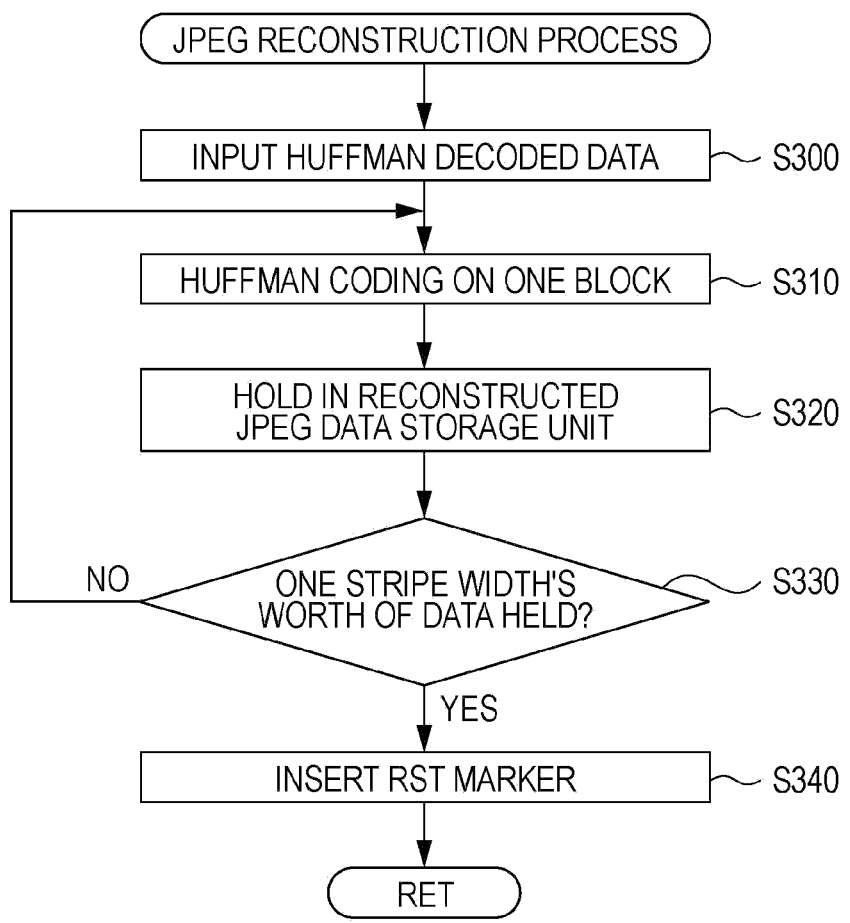
FIG. 4 is a flowchart illustrating an example of a JPEG reconstruction process.
Figure 5:
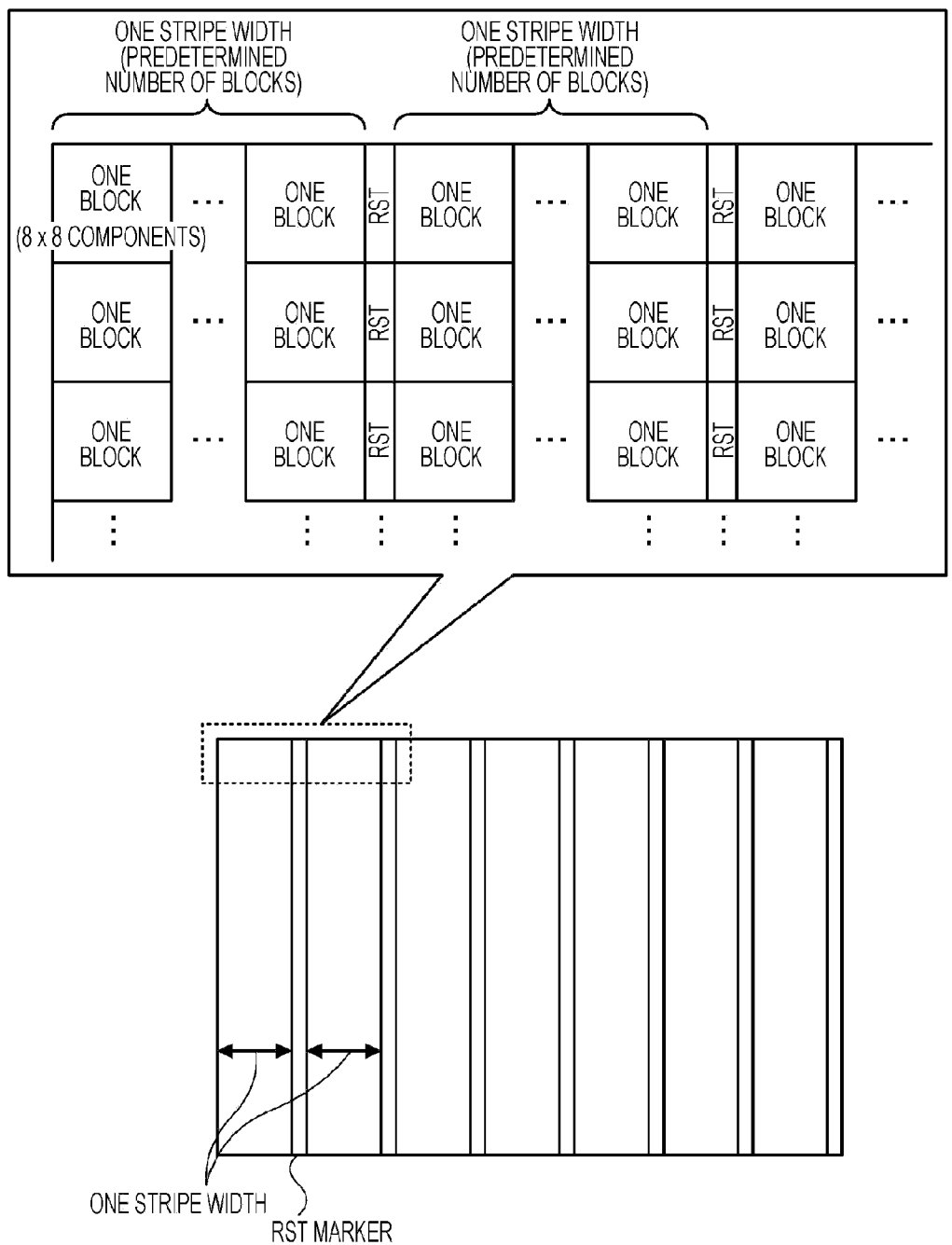
FIG. 5 is a schematic diagram illustrating an image expressed by reconstructed JPEG data.

FIG. 4 is a flowchart illustrating an example of the JPEG reconstruction process, and FIG. 5 is a schematic diagram illustrating an image expressed by the reconstructed JPEG data. In the JPEG data reconstruction process, first, one block's worth of Huffman coded data (a coefficient) that has been Huffman-decoded in step S110 of the aforementioned printing process routine is inputted (step S300), and the JPEG data is reconstructed by Huffman-coding the inputted coefficient (step S310). Then, the JPEG data is stored in the reconstructed JPEG data storage unit 75 on a reconstructed block-by-reconstructed block basis (step S320), after which it is determined whether or not one stripe width's worth of data is stored in a reconstruction buffer (step S330). As mentioned earlier, one stripe width corresponds to a predetermined number of blocks, and thus the stated determination is a determination as to whether the reconstruction process has been completed for the predetermined number of blocks. Note that 8 blocks, 16 blocks, 32 blocks, or the like can be used as the predetermined number of blocks, and this embodiment assumes 16 blocks. When it has been determined in step S330 that one stripe width's worth of data is not stored, the procedure returns to step S310, and the process of Huffman-coding and reconstructing the JPEG data is repeated for the next block (step S310, S320). However, when the processing is completed for the predetermined number of blocks and it is determined in step S330 that one stripe width's worth of data is stored, an RST marker is inserted (added) at the end of the one stripe width's worth of data (that is, the predetermined number of blocks) (step S340), after which the process ends. As described earlier, this RST marker is used in the rotation process. This reconstruction process results in the reconstruction of marker-inserted JPEG data in which an RST marker is inserted every predetermined number of blocks, or in other words, every stripe width, as shown in FIG. 5. Note that in the case where, for example, the number of pixels is 1920 vertical pixels by 2560 horizontal pixels (that is, approximately 5,000,000 pixels), there will be 240 vertical blocks by 320 horizontal blocks; if one stripe width is taken as 16 blocks, 20 RST markers will be inserted in a single block line. The above has been a description of the JPEG reconstruction process.

Returning to step S120 of the printing process routine shown in FIG. 3, when the Huffman decoded data is obtained, the later-stage decoding processes, or in other words, group decoding, run-length decoding, inverse quantization, and inverse DCT, are executed on the obtained Huffman decoded data in that order (step S130), the YCbCr values obtained as a result of the later-stage decoding processes are color-converted into RGB values (step S140), the RGB values are resized based on the display size of the display unit 52 (step S150), and the resulting data is stored in the image data storage unit 73 (a display buffer) (step S160). The processes of steps S110 through S160 are repeatedly executed until the processing is complete for all of the blocks (step S170), and when all the blocks have been processed, a UI display that displays the image to be printed is made in the display unit 52 (step S180), and the apparatus stands by for an instruction from the user to start printing (step S190). When an instruction for printing is made, it is determined whether or not it is necessary to rotate the image to be printed based on, for example, whether rotated printing has been set (step S200). In the case where it is not necessary to rotate the image, the JPEG data saved in the memory card MC is inputted and decoded as-is without rotation (step S210), whereas in the case where it is necessary to rotate the image, rotation/decoding that rotates the reconstructed JPEG data stored in the reconstructed JPEG data storage unit 75 while decoding that data using the RST markers is carried out (step S220). Here, as mentioned earlier, the rotation/decoding can repeatedly be executed, on a stripe width-by-stripe width basis, a process of rotation after decoding all of the blocks in a single stripe width using the RST markers. After the JPEG data has been decoded in this manner, the YCbCr values obtained through the decoding are color-converted to RGB values (step S230), print data is created by converting the RGB values into CMYK values, converting the CMYK values into binary data, and so on (step S240), a printing process that controls the printer unit 30 based on the created print data is executed (step S250), and the routine ends.

Here, the correspondence relationships between the constituent elements of this embodiment and the constituent elements of the invention will be clarified. The main controller 60 (Huffman decoding unit 72) executing the Huffman decoding in steps S110 and S120 of the printing process routine shown in FIG. 3 of this embodiment corresponds to a "variable-length coding/decoding unit"; the main controller 60 executing the display process of steps S130 through S180 of the printing process routine corresponds to a "first image processing unit"; the Huffman coding unit 76 that executes the JPEG reconstruction process shown in FIG. 4 corresponds to a "recompression unit"; and the main controller 60 executing the rotated printing of steps S220 through S250 of the printing process routine corresponds to a "second image processing unit".

According to the printer 20 of the embodiment described thus far, JPEG data to be printed is Huffman-decoded on a block-by-block basis and the resulting Huffman decoded data is stored in the Huffman decoded data storage unit 71; image data is generated by executing later-stage decoding processes (group decoding, run-length decoding, inverse quantization, inverse DCT) on the Huffman decoded data; a display process for displaying an image in the display unit 52 based on the generated image data is executed; and the JPEG data is reconstructed by inserting RST markers at intervals equivalent to every stripe width while encoding the Huffman decoded data produced during the display process, and is then stored in the reconstructed JPEG data storage unit 75. Then, when rotated printing is instructed, rotation/decoding that performs rotation while decoding the stored reconstructed JPEG data using the RST markers is carried out, print data is created from the image data obtained by the rotation/decoding, and a printing process is executed. In other words, the Huffman decoded data obtained by Huffman-decoding the JPEG data is shared by the display process and the JPEG reconstruction process, and thus the number of instances of Huffman decoding can be reduced. As a result, the time required to execute the rotated printing can be shortened. Furthermore, the display process of steps S130 through S180 in the printing process routine is executed in parallel with a JPEG reconstruction process, and thus the amount of time required to execute the rotated printing can be further reduced.

Although the above embodiment describes executing the display process of steps S130 through S180 in the printing process routine in parallel with the JPEG reconstruction process, the invention is not limited thereto, and the display process and JPEG reconstruction process may be carried out through sequential processing executed in order. Even in such a case, the Huffman decoded data can be shared between the display process and the JPEG reconstruction process, making it possible to reduce the amount of time required to execute the rotated printing.

Figure 6:
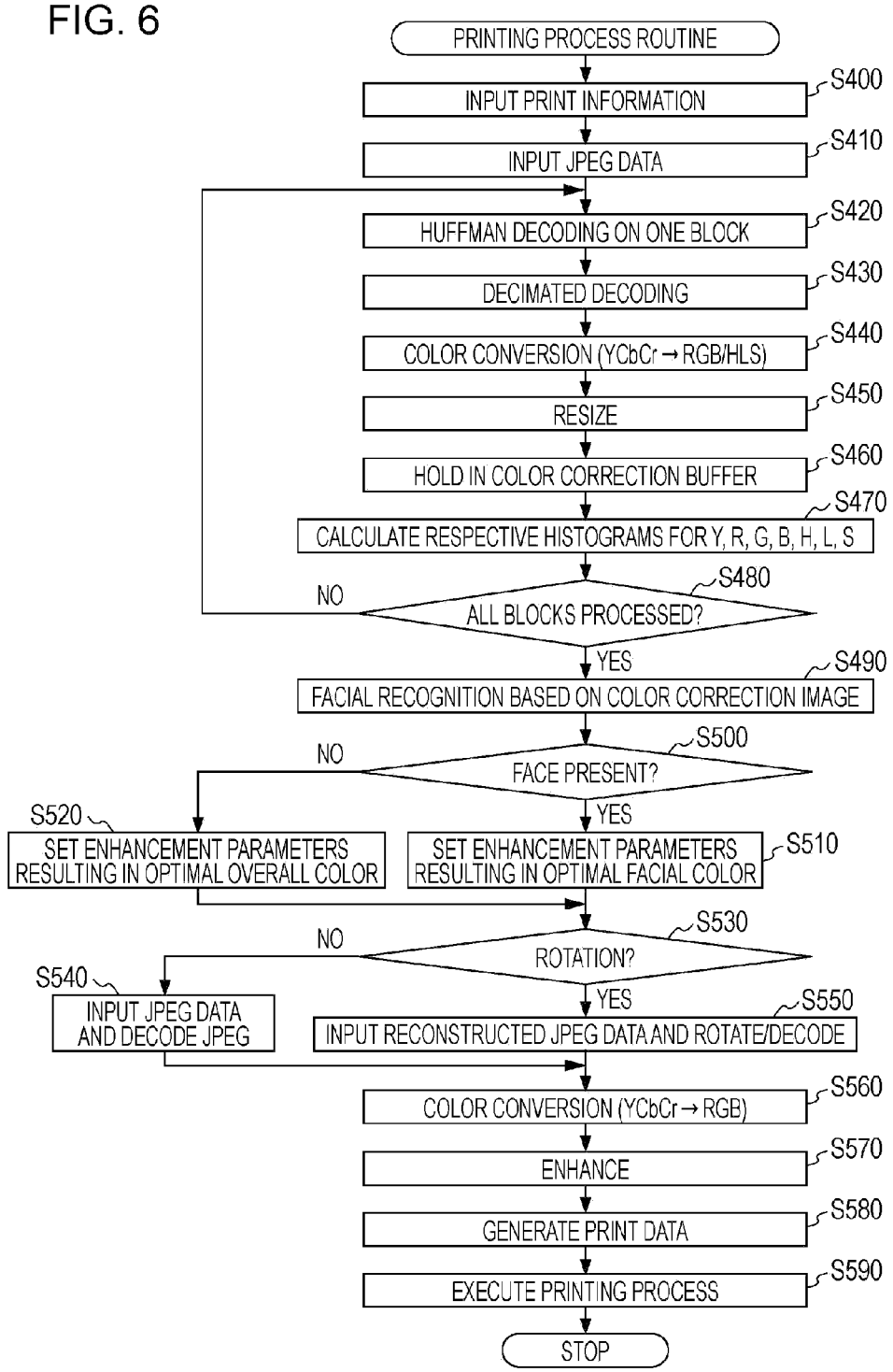
FIG. 6 is a flowchart illustrating a printing process routine according to a variation.

Although the aforementioned embodiment describes an example in which the Huffman decoded data produced during the display process is shared with a JPEG reconstruction process, the invention is not limited thereto, and for example, Huffman decoded data produced when executing a color correction process, such as facial color correction for correcting the color of a person's face, can be shared with the JPEG reconstruction process. FIG. 6 illustrates a printing process routine according to a variation corresponding to such a case. The printing process routine according to this variation is executed when an image to be printed is selected and the start of printing has been instructed. In the printing process routine according to this variation, first, printing information, such as whether or not color correction is specified, whether or not rotated printing is specified, and so on is inputted (step S400), and the compressed data (JPEG data) to be printed is inputted (step S410). Next, one block's worth of the JPEG data is Huffman-decoded and stored in the Huffman decoded data storage unit 71 (steps S420, S430). Through this, reconstructed JPEG data into which RST markers have been inserted is generated through a parallel process performed by the Huffman coding unit 76 (the JPEG reconstruction process illustrated in FIG. 4), and the reconstructed JPEG data is stored in the reconstructed JPEG data storage unit 75. Then, decimated decoding and sampling are performed on the obtained Huffman decoded data (step S430). Here, the decimated decoding is carried out by executing group decoding, run-length decoding, and inverse quantization in order, converting the data into DCT coefficients of 8×8 components; the AC components of the DCT coefficients resulting from the conversion are decimated to ½, ¼, ⅛, or the like on the vertical and the horizontal, after which an inverse DCT process is carried out. The decimation of the AC components results in, for example, 16 DCT coefficients remaining for a ½ decimation, four DCT coefficients remaining for a ¼ decimation, and all AC components being removed, with only the DC component remaining, for a ⅛ decimation. Accordingly, an image obtained by performing the inverse DCT process on that data is as follows: for ½ decimation, the vertical and horizontal of the full image are decimated by ½ each, resulting in an overall image that is ¼ the full image; for ¼ decimation, the vertical and horizontal of the full image are decimated by ¼ each, resulting in an overall image that is 1/16 the full image; and for ⅛ decimation, the vertical and horizontal of the full image are decimated by ⅛ each, resulting in an overall image that is 1/64 the full image. As a result of this decimated decoding, decimated images are generated for each of the YCbCr components. Then, a color conversion process that converts the YCbCr values obtained through the decimated decoding into RGB values and HLS (hue, luminosity, and saturation) values is executed (step S440), the image is resized (reduced) to a size required for facial recognition, mentioned later (step S450), and the data is stored in a color correction buffer provided in the RAM 66 (step S460); in addition, histograms are calculated for the respective obtained RGB and HLS values (step S480). The processes of steps S420 through S470 are then repeated until the processing is complete for all of the blocks (step S480), and when all of the blocks have been processed, facial recognition is carried out based on the image stored in the color correction buffer (step S490), and it is determined whether or not the image contains a face (step S500). Note that the facial recognition can be carried out using a known facial recognition algorithm, such as extracting features such as eyes, the nose, and so on and comparing those features with standardized face data. In the case where the image contains a face, enhancement parameters are set so as to achieve an optimal face color (step S510), whereas in the case where the image does not contain a face, enhancement parameters are set so as to achieve an optimal overall color image (step S520). Here, the setting of the enhancement parameters is carried out by, for example, extracting feature amounts of color parameters from the respective RGB and HLS value histograms and setting the enhancement parameters so that the extracted feature amounts approach optimal feature amounts set in advance for the respective cases where the image contains a face and the image does not contain a face. It is then determined whether or not it is necessary to rotate the image to be printed (step S530); in the case where it is not necessary to rotate the image, the JPEG data saved in the memory card MC is inputted and decoded as-is without rotation (step S540), whereas in the case where it is necessary to rotate the image, rotation/decoding that rotates the reconstructed JPEG data stored in the reconstructed JPEG data storage unit 75 while decoding that data using the RST markers is carried out (step S550). After the JPEG data has been decoded in this manner, the YCbCr values obtained through the decoding are color-converted to RGB values (step S560), an enhancement process based on the enhancement parameters set in step S510 or S520 is executed (step S570), print data is created from the enhanced RGB values (step S580), a printing process that controls the printer unit 30 based on the created print data is executed (step S590), and the routine ends.

Although the aforementioned embodiment describes decoding using the JPEG data saved in the memory card MC in the case where it has been determined that it is not necessary to rotate the image in step S200 of the printing process routine illustrated in FIG. 3, the decoding may be carried out using the reconstructed JPEG data. In this case, it is not necessary to rotate the image, and thus the decoding may be carried out directly, ignoring the RST markers.

Although the aforementioned embodiment describes using the reconstructed JPEG data in the rotation/decoding process that uses the RST markers (that is, the rotated printing), the invention is not limited thereto, and the reconstructed JPEG data can be applied to any other process as long as the process uses that data to decode compressed data using RST markers, such as partially decoding compressed data and trimming an image, partially decoding compressed data and carrying out color correction, and so on.

Although the aforementioned embodiment describes JPEG data as an example of a compressed image, the invention is not limited thereto, and any compressed image that has been compressed through variable-length coding such as Huffman coding can be used, including, for example, MPEG data and the like.

Although the aforementioned embodiment describes the invention as being applied in the printer 20 that includes a printer function (the printer unit 30) and a scanner function (the scanner unit 35), the invention is not limited thereto, and the invention may be applied in an apparatus that further includes a fax function, or in a printer that does not include a scanner function. In addition, the invention is not limited to a printer, and can be applied in any device, such as a personal computer, digital camera, game device, mobile telephone, and so on as long as the device is capable of decompressing a compressed image compressed with a compression technique that uses variable-length coding and executing image processing on that image.

Note that the invention is not intended to be limited in any way to the foregoing embodiment, and it goes without saying that the invention can be carried out in various forms within the technical scope thereof.

What is claimed is:

1. An image processing apparatus that generates image data by decoding compressed data compressed through a compression process that includes a variable-length coding process and processes the generated image data, the apparatus comprising:
    a variable-length coding/decoding unit that generates intermediate data by executing a variable-length coding/decoding process on variable-length code of the compressed data in order to display or sample the compressed data;
    a first image processing unit that generates image data by executing a later-stage decoding process on the intermediate data and displays or samples the generated image data;
    a recompression unit that generates recompressed data by executing the variable-length coding process in parallel with the first image processing unit while sharing the intermediate data with the first image processing unit and inserting a restart marker every predetermined number of coded units; and
    a second image processing unit including a rotation/decoding process that repeatedly executes a process for generating partial image data by partially performing the variable-length coding/decoding process on variable-length code of the recompressed data using the restart markers and partially performing the later-stage decoding process, and rotating the generated partial image data.

2. The image processing apparatus according to claim 1, wherein the compression process is a process including a DCT process and a quantization process in a stage prior to the variable-length coding process; and
    the later-stage decoding process is a process including an inverse quantization process and an inverse DCT process in a stage after the variable-length coding/decoding process.

3. The image processing apparatus according to claim 1, wherein the second image processing unit is a print processing unit that prints the recompressed data.

4. A printing apparatus comprising the image processing apparatus according to claim 1, the printing apparatus further comprising:
    a display unit that displays image data;
    a connection unit to which is mounted a storage medium that holds the compressed data; and
    an operation unit for accepting an operation from a user,
    wherein when the storage medium is mounted in the connection unit, the intermediate data is created from the compressed data by the variable-length coding/decoding unit, and a process of the first image processing unit displaying the image data in the display unit and a recompression process of the recompression unit inserting the restart markers are executed in parallel by the intermediate data being shared between the processes; and
    a printing process is executed by the second image processing unit immediately in response to an instruction from the operation unit.

5. The image processing apparatus according to claim 1, further comprising:
    a memory that stores the variable-length coding/decoding unit, the first image processing unit, the recompression unit, and the second image processing unit; and
    a central processing unit (CPU) that executes the variable-length coding/decoding unit, the first image processing unit, the recompression unit, and the second image processing unit.

6. The image processing apparatus according to claim 1, further comprising a card controller that receives the compressed data from a memory card.

7. The image processing apparatus according to claim 1, further comprising a display unit that displays the recompressed data.

8. An image processing method that generates image data for an image processing apparatus by decoding compressed data compressed through a compression process that includes a variable-length coding process and processes the generated image data, the method comprising:
    (a) receiving the compressed data as data to be output;
    (b) generating intermediate data by executing a variable-length coding/decoding process on variable-length code of the compressed data in order to display or sample the compressed data;
    (c) executing a first image process that generates image data by executing a later-stage decoding process on the intermediate data generated in the above generation (b) and displays or samples the generated image data;
    (d) executing, in parallel with the first image process, a process for generating recompressed data by executing the variable-length coding process on the intermediate data while sharing the intermediate data generated in the above generation (b) and inserting a restart marker every predetermined number of coded units;
    (e) executing a second image process including a rotation/decoding process that partially performing the variable-length coding/decoding process on variable-length code of the recompressed data generated in the above execution (d) using the restart markers and partially performing the later-stage decoding process, and generating the partial image data and repeatedly executing a process of rotating the generated partial image data; and
    (e) outputting the recompressed data by at least one of printing the recompressed data and displaying the recompressed data on a screen.

9. The image processing method according to claim 8, wherein the compression process is a process including a DCT process and a quantization process in a stage prior to the variable-length coding process; and the later-stage decoding process is a process including an inverse quantization process and an inverse DCT process in a stage after the variable-length coding/decoding process.

10. The image processing method according to claim 8, wherein:
the outputting includes printing the recompressed data; and
the method is performed by a printer that prints the recompressed data.

11. A printing apparatus for performing the method of claim 8, comprising:
a display unit that displays image data;
a connection unit to which is mounted a storage medium that holds the compressed data; and
an operation unit for accepting an operation from a user, wherein when the storage medium is mounted in the connection unit, the printing apparatus creates the intermediate data from the compressed data, and a process of displaying the image data in the display unit and a recompression process inserting the restart markers are executed in parallel by the intermediate data being shared between the processes; and
wherein the printing apparatus executes a printing process immediately in response to an instruction from the operation unit.

12. The image processing method according to claim 8, wherein:
the outputting includes displaying the recompressed data on the screen; and
the method is performed by an apparatus that includes the screen.

13. The image processing method according to claim 8, wherein the compressed data received in the above receiving (a) is received from a memory card.

* * * * *